(No Model.)

H. L. ELTON & N. J. SMITH.
PNEUMATIC PAD FOR BICYCLE OR LIKE HANDLES.

No. 597,108. Patented Jan. 11, 1898.

Witnesses
E. C. Wurdeman
J. J. Williamson

Inventors
Howard L. Elton
Norman J. Smith
by Geo. H. Holgate
Attorney

UNITED STATES PATENT OFFICE.

HOWARD L. ELTON AND NORMAN J. SMITH, OF PHILADELPHIA, PENNSYLVANIA.

PNEUMATIC PAD FOR BICYCLE OR LIKE HANDLES.

SPECIFICATION forming part of Letters Patent No. 597,108, dated January 11, 1898.

Application filed July 15, 1896. Serial No. 599,254. (No model.)

*To all whom it may concern:*

Be it known that we, HOWARD L. ELTON and NORMAN J. SMITH, citizens of the United States, residing at Philadelphia, in the county of Philadelphia and State of Pennsylvania, have invented certain new and useful Improvements in Pneumatic Pads for Bicycle or Like Handles, of which the following is a specification.

This invention relates to a new and useful improvement in pneumatic pads for bicycle-handles and the like, and has for its object to provide a device of this description which may be readily passed over the ordinary handle of a bicycle and by the inflation thereof will be securely held in place and afford a yielding pad against which the hand of the rider may rest, thus avoiding the constant wear and tear incident to the use of solid handles.

With these ends in view this invention consists in the details of construction and combination of elements hereinafter set forth and then specifically designated by the claim.

In order that those skilled in the art to which this invention appertains may understand how to make and use the same, its construction and operation will now be described in detail, referring to the accompanying drawings, forming a part of this specification, in which—

Figure 1:
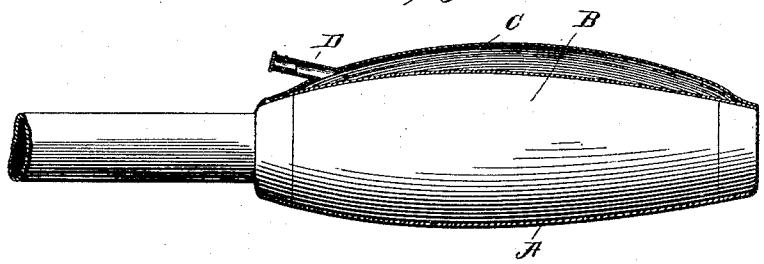
Figure 2:
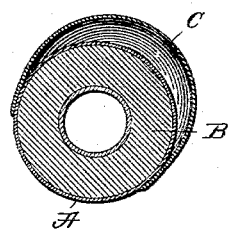

Figure 1 is an elevation of a bicycle-handle, showing this improvement in section applied thereto; and Fig. 2, a cross-section thereof.

In carrying out this invention we provide a casing A, of rubber or other suitable material of tubular form, adapted to pass over the handle B, and formed with or secured to this casing is the pad-casing C, so arranged that when it is inflated it will form a yielding surface against which the hand of the rider may bear. A valve D is located near one end of this casing and communicates with the interior thereof, so that by the application of an air-pump or other means the compartment therein may be filled with air under pressure, which will force the tube-casing outward and that section of the casing A next adjacent to said casing inward, thereby causing the casing A to fit snugly against the handle B, which will prevent its accidental removal; but when it is desired to remove this improvement from the handle it is only necessary to deflate the pad-casing by the proper manipulation of the valve D, when the casing A may be withdrawn from the handle, being sufficiently elastic for that purpose.

By the use of this improvement the rider may more firmly grip the handles of the machine, since his hand will become partly embedded within the pad and will not be injured or rendered sore from this pressure, and as it is customary for persons riding long distances to support a large part of their weight upon the handles of the bicycle it is obvious that the pad will serve the purpose of cushioning this weight and prevent the transmission of the vibrations of the machine directly to the hands, arms, and body of the rider, and this is of great importance in that these vibrations under ordinary conditions are the most serious drawbacks to bicycle-riding, especially when riding over rough surfaces.

Another advantage of this improvement is that it may be applied to any ordinary handles without alteration of the latter, as the elasticity of the casing A is sufficient to permit it to pass over the enlargement of the handle and yet contract thereon to prevent displacement, the liability of which is further reduced by the inflation of the pad, as before described. Should the rider desire so to do, the casings may be slipped over the handles and onto the handle-bars and there held by further inflation, so that the hands of the rider may be supported near the center of the handle-bars, as is sometimes done for convenience and rest.

Having thus fully described this invention, what is claimed as new and useful is—

In a pneumatic pad, a tubular casing of flexible material, a strip of flexible material secured at its ends around the ends of the tubular casing and along its sides to opposite sides of the casing forming a pocket, a valve leading into the pocket, said casing being adapted to fit on the ends of a handle-bar and be held thereon by the inflation of the pocket, substantially as described.

In testimony whereof we have hereunto affixed our signatures in the presence of two subscribing witnesses.

HOWARD L. ELTON.
NORMAN J. SMITH.

Witnesses:
S. S. WILLIAMSON,
MARK BUFORD.